United States Patent
Yu et al.

(10) Patent No.: US 12,556,202 B2
(45) Date of Patent: Feb. 17, 2026

(54) ELECTRONIC DEVICE AND OPERATION METHOD THEREOF

(71) Applicant: SAMSUNG ELECTRONICS CO., LTD., Suwon-si (KR)

(72) Inventors: Seunghun Yu, Suwon-si (KR); Kwonyeol Park, Suwon-si (KR); Kyusuk Mo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 18/602,610

(22) Filed: Mar. 12, 2024

(65) Prior Publication Data
US 2024/0313805 A1    Sep. 19, 2024

(30) Foreign Application Priority Data

Mar. 13, 2023   (KR) .................. 10-2023-0032618

(51) Int. Cl.
*H03M 13/39* (2006.01)
*H03M 13/11* (2006.01)

(52) U.S. Cl.
CPC .... *H03M 13/3911* (2013.01); *H03M 13/1125* (2013.01)

(58) Field of Classification Search
CPC ......... H03M 13/3911; H03M 13/1125; H03M 13/612; H04B 7/0857; H04B 7/0413; H04L 25/03286
See application file for complete search history.

(56) References Cited

U.S. PATENT DOCUMENTS

| | | |
|---|---|---|
| 10,182,439 B2 | 1/2019 | Choi et al. |
| 10,778,300 B2 | 9/2020 | Kwon et al. |
| 10,931,360 B2 | 2/2021 | Kwon et al. |
| 2006/0234777 A1* | 10/2006 | Vannithamby ........ H04W 88/08 455/562.1 |
| 2008/0025443 A1* | 1/2008 | Lee ...................... H04B 7/0857 375/347 |

(Continued)

FOREIGN PATENT DOCUMENTS

| | | |
|---|---|---|
| KR | 10-2009-0012530 A | 2/2009 |
| KR | 10-2009-0065334 A | 6/2009 |

(Continued)

OTHER PUBLICATIONS

J. Wu, M. El-Khamy, J. Lee and I. Rang, "LLR optimization for iterative MIMO BICM receivers," 2014 IEEE International Conference on Acoustics, Speech and Signal Processing (ICASSP), Florence, Italy, 2014.*

*Primary Examiner* — Steve N Nguyen
(74) *Attorney, Agent, or Firm* — Sughrue Mion, PLLC (57) ABSTRACT

Provided are an electronic device capable of learning a log likelihood ratio (LLR) scaling factor distribution, and an operation method of the electronic device. The operation method of the electronic device includes receiving training environment information, obtaining a measurement log likelihood ratio (LLR) distribution, based on the training environment information, obtaining an inter-distribution divergence value, based on a reference LLR distribution and the measurement LLR distribution, and obtaining an LLR scaling factor distribution by converting the inter-distribution divergence value into a probability value.

17 Claims, 10 Drawing Sheets

(56) References Cited

U.S. PATENT DOCUMENTS

| | | | |
|---|---|---|---|
| 2008/0310564 A1* | 12/2008 | Andrews | H04L 25/067 375/348 |
| 2009/0238287 A1* | 9/2009 | Lee | H04L 25/067 375/243 |
| 2010/0202572 A1* | 8/2010 | Bae | H04L 1/1845 375/341 |
| 2012/0269248 A1* | 10/2012 | Lee | H04B 7/0854 375/224 |
| 2017/0126360 A1 | 5/2017 | Millar et al. | |
| 2018/0302168 A1 | 10/2018 | Morero et al. | |
| 2019/0081846 A1* | 3/2019 | Nishimoto | H03M 13/45 |
| 2019/0109737 A1 | 4/2019 | Tumula et al. | |
| 2022/0337341 A1* | 10/2022 | Muraoka | H04L 1/0045 |

FOREIGN PATENT DOCUMENTS

| | | |
|---|---|---|
| KR | 10-2017-0096557 A | 8/2017 |
| KR | 10-2020-0067703 A | 6/2020 |
| KR | 10-2020-0124599 A | 11/2020 |

\* cited by examiner

| TEI | |
|---|---|
| SINR(db) | 15 |
| MO | 4 |
| NEW TX | YES |
| LAYERS | 2 |

ELECTRONIC DEVICE AND OPERATION METHOD THEREOF

CROSS-REFERENCE TO RELATED APPLICATION

This application is based on and claims priority under 35 U.S.C. § 119 to Korean Patent Application No. 10-2023-0032618, filed on Mar. 13, 2023, in the Korean Intellectual Property Office, the disclosure of which is incorporated by reference herein in its entirety.

BACKGROUND

Embodiments are related to an electronic device and an operation method thereof, and more particularly, to an electronic device capable of learning a log-likelihood ratio (LLR) scaling factor distribution, and an operation method of the electronic device.

In a wireless communication system (e.g., Long Term Evolution (LTE), 5th Generation New Radio (5G NR)), a multiple-input multiple-output (MIMO) symbol detector is used to calculate an LLR of coded bits of an MIMO layer. The LLR can be determined using various types of detection methods. The complexity of these detection methods ranges from very high complexity (e.g., a maximum likelihood (ML)) to low complexity (e.g., a minimum mean square error (MMSE)). In general, the performance of a detection method measured by an error rate may be inversely proportional to its complexity. Therefore, the ML can have a minimum error rate and the MMSE can have a maximum error rate.

SUMMARY

Embodiments provide an electronic device capable of selecting a log-likelihood ratio (LLR) scaling factor corresponding to communication environment information by learning an LLR scaling factor distribution, and an operation method of the electronic device. The selected LLR scaling factor may be referred to, as a non-limiting example, as a first LLR scaling factor.

According to an example embodiment, there is provided an operation method of the electronic device including receiving training environment information, obtaining a measurement LLR distribution, based on the training environment information, obtaining an inter-distribution divergence value, based on a reference LLR distribution and the measurement LLR distribution, and obtaining an LLR scaling factor distribution by converting the inter-distribution divergence value into a probability value.

According to another example embodiment, there is provided an electronic device including an LLR scaling factor selector configured to receive communication environment information and select an LLR scaling factor corresponding to the communication environment information, and a symbol detector configured to obtain an output LLR distribution, based on input data and the selected LLR scaling factor. The LLR scaling factor selector receives training environment information, obtains a measurement LLR distribution based on the training environment information, obtains an inter-distribution divergence value based on a reference LLR distribution and the measurement LLR distribution, and converts the inter-distribution divergence value into a probability value to obtain an LLR scaling factor distribution.

According to another example embodiment, there is provided a non-transitory computer readable storage medium that stores instructions to cause a processor, when executing the instructions, to perform log likelihood ratio (LLR) scaling factor distribution learning, the LLR scaling factor distribution learning including receiving training environment information, obtaining a measurement LLR distribution, based on the training environment information, obtaining an inter-distribution divergence value, based on a reference LLR distribution and the measurement LLR distribution, and obtaining an LLR scaling factor distribution by converting the inter-distribution divergence value into a probability value.

BRIEF DESCRIPTION OF THE DRAWINGS

Embodiments are described below with respect to the following drawings in which.

DETAILED DESCRIPTION OF THE EMBODIMENTS

Various embodiments are described below with reference to accompanying drawings.

Figure 1:
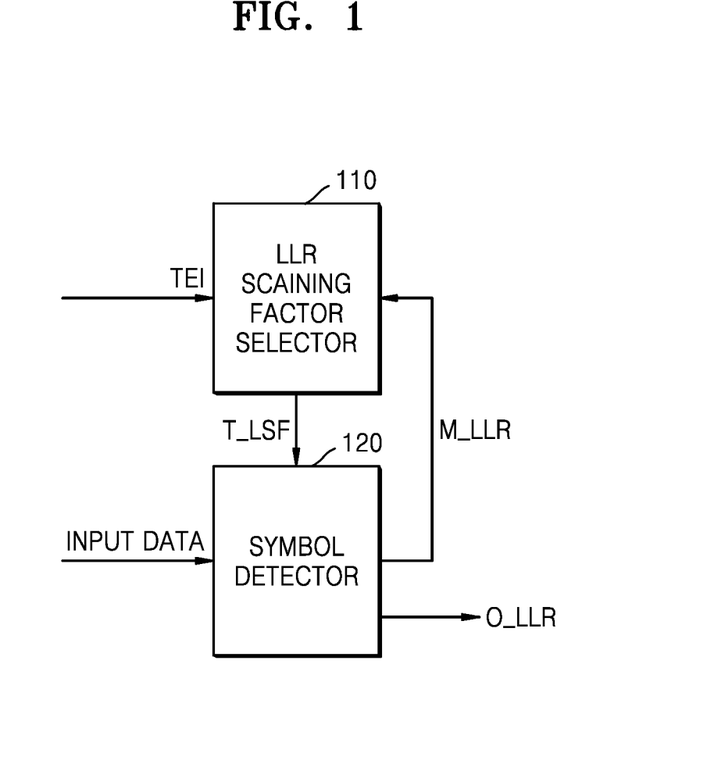
FIG. 1 is a block diagram of an electronic device according to an embodiment.

FIG. 1 is a block diagram of an electronic device according to an embodiment.

Referring to FIG. 1, the electronic device may include a log-likelihood ratio (LLR) scaling factor selector 110 and a symbol detector 120. Input data INPUT DATA may include a plurality of data bits.

The electronic device shown in FIG. 1 may perform a soft decision. The soft decision may refer not to deciding whether a data bit is 0 or 1, but measuring a distance between a data bit and 0 or between a data bit and 1 and performing decoding by using the measured distance. The electronic device may reduce errors generated during decoding by performing soft decision.

The symbol detector 120 may receive the input data INPUT DATA and generate a measurement LLR distribution M_LLR. In some embodiments, the measurement LLR distribution M_LLR, or an output LLR distribution O_LLR of FIG. 2 may refer to a data distribution for soft decision. In other words, the measurement LLR distribution M_LLR, or the output LLR distribution O_LLR of FIG. 2 may include information about the distance between the data bit and 0 or the distance between the data bit and 1.

For example, when the distance between the data bit and 0 is quantized as 0, 0.2, 0.5, 0.8, or 1, the symbol detector

120 may generate, as a raw LLR value, one of 0, 0.2, 0.5, 0.8, and 1 for a received data bit. However, this is only an example, and a method of quantizing the distance between the data bit and 0 or 1 may be set differently according to embodiments.

The symbol detector 120 may generate a plurality of raw LLR values by using a plurality of data bits. A set representing the numbers of data bits respectively corresponding to the plurality of raw LLR values may be referred to as a raw LLR distribution. For example, when the numbers of data bits respectively corresponding to 0, 0.2, 0.5, 0.8, and 1 are 12, 5, 3, 2, and 10, a raw LLR distribution may be { 12, 5, 3, 2, 10}.

However, depending on an embodiment, the size of data representing a raw LLR value may be large enough to perform decoding, and a decoding speed may be slowed down. Accordingly, the symbol detector 120 may output and quantize only N least significant bits (LSBs) by scaling a raw LLR value as shown in Equation 1 below (where N is a natural number greater than or equal to 1).

$$LLR_M = LLR_0 * 2^Q (LSB\ N\ \text{bits}) \quad \text{[Equation 1]}$$

In Equation 1, $LLR_0$ may indicate a raw LLR value, Q may indicate an LLR scaling factor, and $LLR_M$ may indicate a measurement LLR value. An LLR scaling factor, which is a value used to scale the raw LLR value, may be referred to as a Q factor. A distribution of measurement LLR values output according to the value of the LLR scaling factor may vary. The distribution of measurement LLR values may be referred to as the measurement LLR distribution M_LLR.

A high-quality measurement LLR distribution M_LLR may refer to a distribution biased toward 0 or 1. In detail, when measurement LLR values are close to 0 or close to 1, less errors may occur during decoding. An LLR scaling factor value for obtaining a high-quality LLR distribution according to a communication environment may vary. Accordingly, the LLR scaling factor selector 110 may learn the LLR scaling factor for obtaining a high quality LLR distribution according to a communication environment. A method of obtaining the LLR scaling factor for obtaining a high-quality LLR distribution will now be described.

The LLR scaling factor selector 110 may receive training environment information TEI. The training environment information TEI may be a vector including data related to the LLR scaling factor distribution. The training environment information TEI may refer to information that is used to learn the LLR scaling factor. For example, the training environment information TEI may include at least one of a Signal to Interference plus Noise Ratio (SINR), a modulation order (MO), new transmission or non-transmission, and the number of layers.

A pair of training environment information TEI and its corresponding LLR scaling factor distribution may refer to one piece of data used for LLR scaling factor learning. The training environment information TEI will be described later with reference to FIG. 5.

The LLR scaling factor selector 110 may adjust a training LLR scaling factor T_LSF, and the symbol detector 120 may output a measurement LLR distribution M_LLR corresponding to each training LLR scaling factor T_LSF. The training LLR scaling factor T_LSF may refer to an LLR scaling factor used when the LLR scaling factor is learned.

The LLR scaling factor selector 110 may learn an LLR scaling factor distribution for each training environment information TEI. When a j-th training LLR scaling factor T_LSF is selected, a measurement LLR distribution M_LLR corresponding to the j-th training LLR scaling factor T_LSF may be generated by the symbol detector 120. A probability distribution of the measurement LLR distribution M_LLR may be exemplarily expressed as in Equation 2 below.

$$P_{y_j, TEI}(k) = \frac{LLR_{k,j}}{LLR_{total,j}}, \quad 1 \leq k \leq 2n+1 \quad \text{[Equation 2]}$$

In Equation 2 and below, TEI may indicate training environment information, $y_j$ may indicate a measurement LLR value when a j-th training LLR scaling factor is selected, $LLR_{k,j}$ may indicate the number of k-th quantized LLR values, and $LLR_{total,j}$ may indicate the total number of first through $(2n+1)^{th}$ quantized LLR values.

The LLR scaling factor selector 110 may include a reference LLR distribution. The reference LLR distribution may refer to an LLR distribution corresponding to a high-quality LLR distribution. The reference LLR distribution may be a value pre-determined within the LLR scaling factor selector 110 prior to LLR scaling factor learning for comparison with the measurement LLR distribution M_LLR. In other words, when the measurement LLR distribution M_LLR is similar to the reference LLR distribution, it may mean that the quality of the measurement LLR distribution M_LLR is high. The reference LLR distribution may be referred to as a Q distribution in the disclosure. A probability distribution of the reference LLR distribution, that is, a probability distribution of the Q distribution, may be exemplarily expressed as in Equation 3 below.

$$P(\Delta_k, Q) = \begin{cases} \dfrac{\sum_{k \in \mathcal{L}} \Delta_k - 1}{2 \sum_{k \in \mathcal{L}} \Delta_k} & \text{if } k = 1 \text{ or } 2n+1, \\ \tau_{k-1} P(\Delta_1, Q) & \text{if } 2 \leq k < n+1, \\ \tau_{2n+1-k} P(\Delta_1, Q) & \text{otherwise.} \end{cases} \quad \text{[Equation 3]}$$

In Equation 3 and below, $\Delta_k$ may indicate the number of k-th quantized LLR values, $\mathcal{L} = \{\Delta_1, \Delta_2, \ldots, \Delta_{2n+1}\}$ may indicate a distribution of quantized LLR values quantized to 2n+1 quantized LLR values, Q may indicate a reference LLR distribution, and $\tau_k$ may indicate $2^{-k}$. The reference LLR distribution will be described later with reference to FIG. 7.

The LLR scaling factor selector 110 may obtain an inter-distribution divergence value, based on the reference LLR distribution and the measurement LLR distribution M_LLR as shown in Equation 4 below.

$$E(y_j, TEI) = \sum_k f(k|TEI, y_j), \quad 1 \leq k \leq 2n+1 \quad \text{[Equation 4]}$$

$$f(k|TEI, y_j) = \begin{cases} P_{y_j, TEI}(k) \ln \dfrac{P_{y_j, TEI}(k)}{P(\Delta_k, Q)}, & \text{if } P_{y_j, TEI}(k) > P(\Delta_k, Q), \\ k = 1 \text{ or } 2n+1 \\ P(\Delta_k, Q) \ln \dfrac{P(\Delta_k, Q)}{P_{y_j, TEI}(k)}, & \text{otherwise.} \end{cases}$$

A function representing the inter-distribution divergence value, $E(y_j, TEI)$ may be referred to as an estimator function. $E(y_j, TEI)$ may refer to a function representing a similarity between the reference LLR distribution and the measurement LLR distribution M_LLR, when one training LLR scaling factor T_LSF is selected for the training environment information TEI. In other words, when the measurement LLR distribution M_LLR is similar to the reference LLR distribution, the value of the estimator function may increase.

The LLR scaling factor selector 110 may obtain an LLR scaling factor distribution by converting the inter-distribution divergence value into a probability value as shown in Equation 5 below. The LLR scaling factor distribution may refer to a probability distribution according to Equation 5 below. $P(y_j, TEI)$ in Equation 5 is a softmax activation function.

$$P(y_j, TEI) = \frac{\exp(E(y_j, TEI))}{\sum_{j=1}^{c} \exp(E(y_j, TEI))} \quad \text{[Equation 5]}$$

In Equation 5 and below, c may indicate the number of configurable training LLR scaling factors T_LSF.

In some embodiments, the LLR scaling factor selector 110 may be a Bayes classifier using Gaussian Naive Bayes. In other words, the probability distribution $P(y_j|TEI)$ in Equation 5 may be a posterior probability, and a result according to $P(y_j|TEI)$ may follow a normal distribution.

Given that a set of probability distributions for the training LLR scaling factor T_LSF is D, when i-th training environment information TEI is given, the set of probability distributions for the training LLR scaling factor T_LSF may be expressed as $D_i = \{d_{x_i}^{y_1}, d_{x_i}^{y_2}, \ldots, d_{x_i}^{y_c}\}$. Because the set $D_i$ is a set of probability distributions, a sum of all components may be 1 as shown in Equation 6 below.

$$\sum_{j} d_{x_i}^{y_j} = 1, (j = 1, 2, \ldots, c) \quad \text{[Equation 6]}$$

In some embodiments, the electronic device may be a non-transitory computer readable storage medium that stores instructions to cause a processor to perform LLR scaling factor distribution learning when executed by the processor.

The electronic device may train the LLR scaling factor selector 110 by performing the above operations. The LLR scaling factor selector 110 may perform learning by using the training environment information TEI and the LLR scaling factor distribution, and learning may be terminated when a prediction degree of the LLR scaling factor selector 110 reaches a certain value or higher.

Then, as will described later with reference to FIG. 3, the LLR scaling factor selector 110 may receive communication environment information (e.g., CEI of FIG. 3) including data related to the LLR scaling factor distribution. The LLR scaling factor selector 110 may determine training environment information TEI most similar to the communication environment information CEI. The LLR scaling factor selector 110 may select a training LLR scaling factor T_LSF corresponding to the determined training environment information TEI, as a communication LLR scaling factor (e.g., C_LSF of FIG. 3). For example, the LLR scaling factor selector 110 may select, as the communication LLR scaling factor, a training LLR scaling factor T_LSF corresponding to a largest probability value among the probability values included in the LLR scaling factor distribution.

The electronic device may learn the LLR scaling factor distribution to select a training LLR scaling factor T_LSF so that the high-quality LLR distribution is output. The electronic device may reduce decoding errors by performing decoding based on the high-quality LLR distribution.

Figure 2:
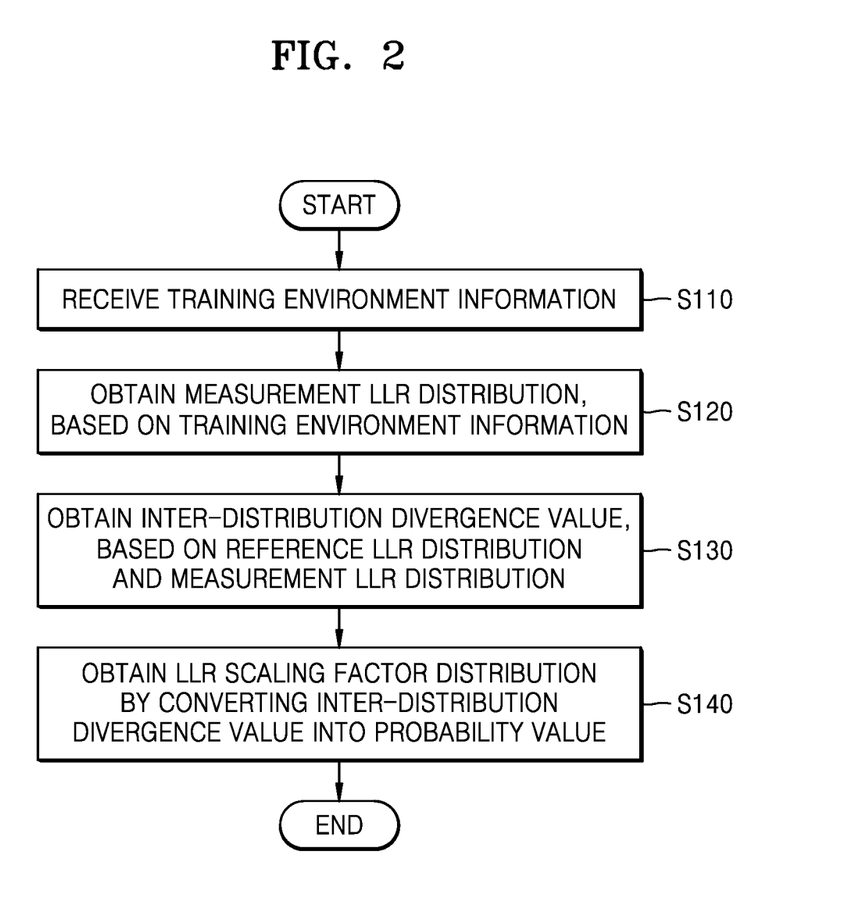
FIG. 2 is a flowchart of an operation method of an electronic device, according to an embodiment.

FIG. 2 is a flowchart of an operation method of an electronic device, according to an embodiment. FIG. 2 will now be described with reference to FIG. 1.

The operation method of an electronic device may include operations S110 through S140.

In operation S110, the electronic device may receive training environment information TEI. The training environment information TEI may be a vector including data related to the LLR scaling factor distribution. The training environment information TEI may refer to information that is used to learn the LLR scaling factor. For example, the training environment information TEI may include at least one of an SINR, an MO, new transmission or non-transmission, and the number of layers.

In operation S120, the electronic device may obtain measurement LLR distribution M_LLR, based on the training environment information TEI. The LLR scaling factor selector 110 may adjust a training LLR scaling factor T_LSF, and the symbol detector 120 may output a measurement LLR distribution M_LLR corresponding to each training LLR scaling factor T_LSF. A probability distribution of the measurement LLR distribution M_LLR may be expressed using the probability distribution described above with reference to Equation 2.

In operation S130, the electronic device may obtain an inter-distribution divergence value, based on the reference LLR distribution and the measurement LLR distribution M_LLR. A probability distribution of the reference LLR distribution may be expressed using the probability distribution described above with reference to Equation 3.

The inter-distribution divergence value may be obtained using the estimator function described above with reference to Equation 4. Referring to Equation 4, the estimator function may be obtained using the probability distribution of the measurement LLR distribution M_LLR and the probability distribution of the reference LLR distribution.

In operation S140, the electronic device may obtain an LLR scaling factor distribution by converting the inter-distribution divergence value into a probability value. The probability value may be obtained using the softmax activation function described above with reference to Equation 5.

Figure 3:
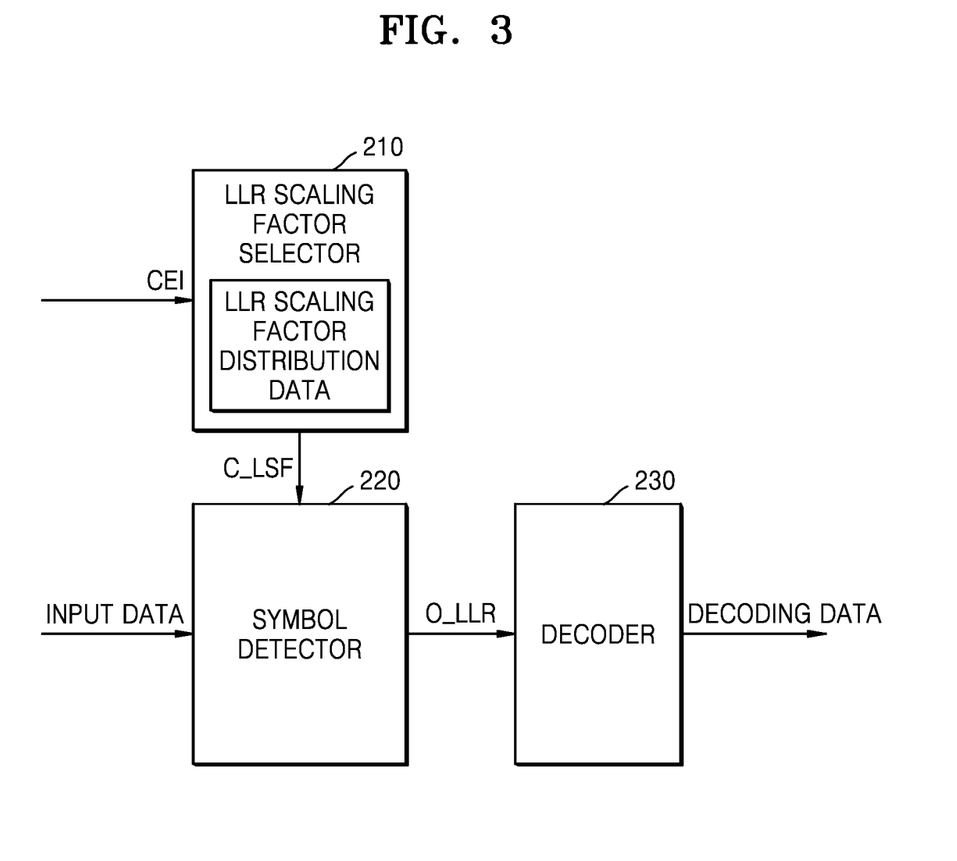
FIG. 3 is a block diagram of an electronic device according to an embodiment.

FIG. 3 is a block diagram of an electronic device according to an embodiment.

Referring to FIG. 3, the electronic device may include an LLR scaling factor selector 210, a symbol detector 220, and a decoder 230. Input data INPUT DATA may include a plurality of data bits.

The LLR scaling factor selector 210 may include LLR scaling factor distribution data generated by performing the LLR scaling factor learning described above with reference to FIGS. 1 and 2. In other words, the LLR scaling factor data may include an LLR scaling factor distribution corresponding to each training environment information TEI.

The LLR scaling factor selector 210 may receive communication environment information CEI, and may determine training environment information TEI most similar to the communication environment information CEI among pieces of training environment information TEI included in the LLR scaling factor distribution data. For example, the LLR scaling factor distribution data may include first training environment information and second training environment information. The first training environment information may be {SINR=15, MO=4, NEW TX=Yes, LAYERS=2}, and the second training environment information may be {SINR=18, MO=4, NEW TX=Yes, LAYERS-2}. SINR may indicate a signal-to-interference plus noise ratio, MO may indicate a modulation order, NEW TX may indicate new transmission or non-transmission, and LAYERS may indicate the number of layers.

When the communication environment information (CEI) is {SINR=15, MO=4, NEW TX=Yes, LAYERS=2}, the LLR scaling factor selector 210 may determine the first training environment information as the communication environment information CEI most similar to the training environment information TEI. However, this is just an example, and the method of determining the most similar training environment information TEI may vary according to embodiments. The SINR of the communication environment information (CEI) may exemplarily be a value measured by the electronic device, and the MO, new transmission or non-transmission, and number of layers may be values received from the outside of the electronic device.

The LLR scaling factor selector 210 may select a communication LLR scaling factor C_LSF, based on an LLR scaling factor distribution corresponding to the training environment information TEI most similar to the communication environment information CEI. The communication LLR scaling factor C_LSF may refer to an LLR scaling factor for performing decoding. For example, the LLR scaling factor selector 210 may select, as the communication LLR scaling factor C_LSF, a training LLR scaling factor T_LSF having a largest probability value among the LLR scaling factor distribution.

The symbol detector 220 may receive the input data INPUT DATA, and generate an output LLR distribution O_LLR, based on the communication LLR scaling factor C_LSF. The output LLR distribution O_LLR may be described with reference to Equation 1 above. In other words, the symbol detector 220 may generate a plurality of raw LLR values by using a plurality of data bits included in the input data INPUT DATA. The symbol detector 220 may generate the output LLR distribution O_LLR by scaling the raw LLR value and outputting N LSBs.

The decoder 230 may generate decoding data DECODING DATA by performing decoding based on the output LLR distribution O_LLR.

The electronic device may select the communication LLR scaling factor C_LSF so that the high-quality LLR distribution is output, based on the LLR scaling factor distribution data. The electronic device may reduce decoding errors by performing decoding based on a high-quality output LLR distribution O_LLR.

Figure 4:
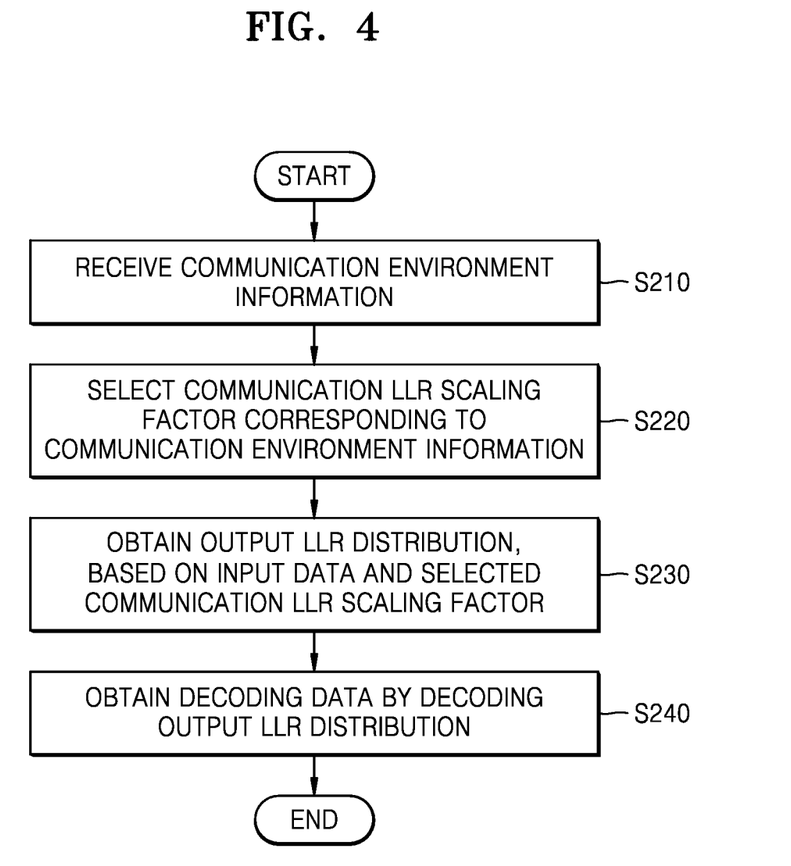
FIG. 4 is a flowchart of an operation method of an electronic device, according to another embodiment.

FIG. 4 is a flowchart of an operation method of an electronic device, according to another embodiment. FIG. 4 will now be described with reference to FIG. 3.

The operation method of an electronic device may include operations S210 through S240.

In operation S210, the electronic device may receive communication environment information CEI. The communication environment information CEI may include information about an environment in which an actual electronic device communicates with the outside after LLR scaling factor distribution learning. Similar to the training environment information TEI, the communication environment information CEI may include at least one of an SINR, an MO, new transmission or non-transmission, and the number of layers.

In operation S220, the electronic device may select a communication LLR scaling factor C_LSF corresponding to the communication environment information CEI. The electronic device may determine training environment information TEI most similar to the communication environment information CEI. The electronic device may select a communication LLR scaling factor C_LSF, based on an LLR scaling factor distribution corresponding to the determined training environment information TEI.

According to some embodiments, the electronic device may select, as the communication LLR scaling factor C_LSF, a training LLR scaling factor T_LSF corresponding to a largest probability value among the probability values included in the LLR scaling factor distribution.

In operation S230, the electronic device may obtain the output LLR distribution O_LLR, based on the input data INPUT DATA and the selected communication LLR scaling factor C_LSF. As described above with reference to FIG. 3, the symbol detector 220 may generate a plurality of raw LLR values by using a plurality of data bits included in the input data INPUT DATA. The symbol detector 220 may obtain the output LLR distribution O_LLR by scaling the raw LLR value and outputting N LSBs.

In operation S240, the electronic device may obtain decoding data DECODING DATA by decoding the output LLR distribution O_LLR.

Figure 5:
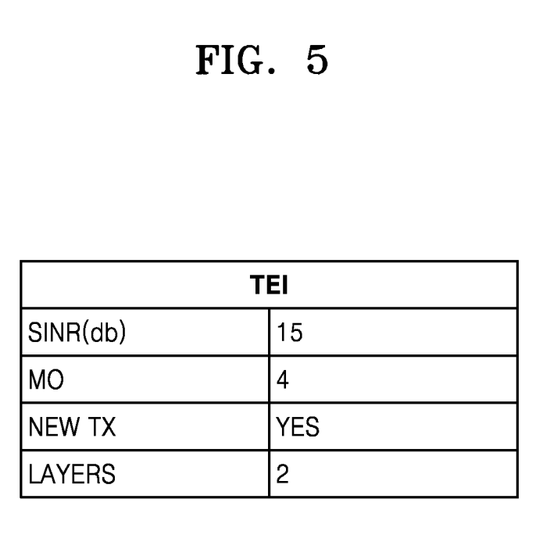
FIG. 5 is a table showing training environment information according to an embodiment.

FIG. 5 is a table showing training environment information according to an embodiment.

The training environment information TEI may include an SINR, an MO, new transmission or non-transmission, and the number of layers. Referring to FIG. 5, SINR may indicate a signal-to-interference plus noise ratio, MO may indicate a modulation order, NEW TX may indicate new transmission or non-transmission, and LAYERS may indicate the number of layers. The data included in the training environment information TEI may be a vector including data related to the LLR scaling factor distribution. Although not shown in FIG. 5, communication environment information CEI may also be described with reference to FIG. 5.

Figure 6:
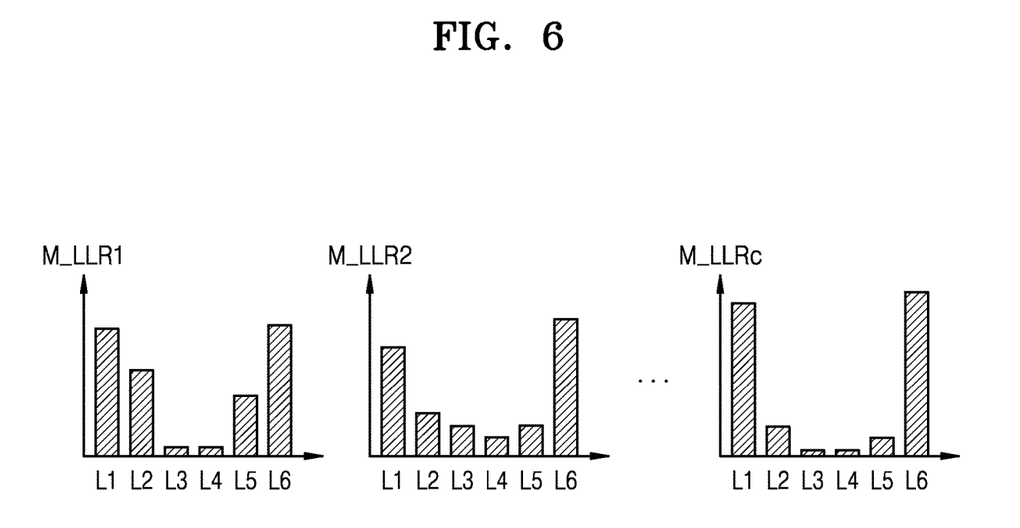
FIG. 6 is a view illustrating a measurement log-likelihood ratio (LLR) distribution according to an embodiment.

FIG. 6 is a view illustrating the measurement LLR distribution M_LLR according to an embodiment. FIG. 6 will now be described in conjunction with FIG. 1.

In detail, FIG. 6 illustrates measurement LLR distributions M_LLR1, M_LLR2, through to M_LLRc corresponding to c training LLR scaling factors T_LSF, respectively. Referring to FIG. 6, when the value of the training LLR scaling factor T_LSF is changed, the measurement LLR distribution M_LLR may also be changed. FIG. 6 may illustrate a case in which LLR values are quantized into L1, L2, L3, L4, L5, and L6.

Figure 7:
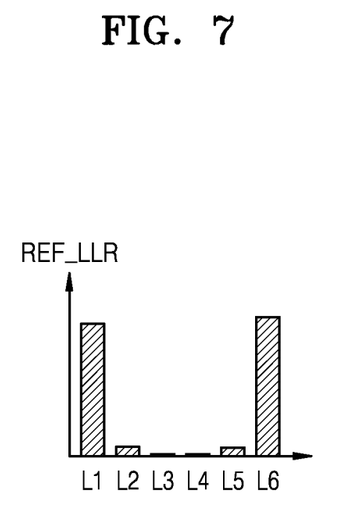
FIG. 7 is a view illustrating a reference LLR distribution according to an embodiment.

FIG. 7 is a view illustrating a reference LLR distribution according to an embodiment.

FIG. 7 may also illustrate a case in which LLR values are quantized into L1, L2, L3, L4, L5, and L6. Compared to the measurement LLR distributions M_LLR1, M_LLR2, through to M_LLRc of FIG. 6, a reference LLR distribution REF_LLR may be a distribution biased toward both extreme values L1 and L6. As the measurement LLR distribution M_LLR becomes similar to the reference LLR distribution REF_LLR, the quality of the measurement LLR distribution M_LLR may increase.

Figure 8:
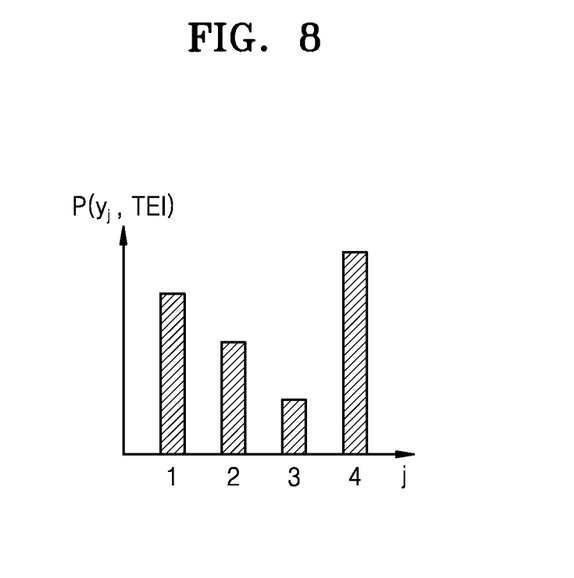
FIG. 8 is a view illustrating an LLR scaling factor distribution according to another embodiment.

FIG. 8 is a view illustrating an LLR scaling factor distribution according to another embodiment.

FIG. 8 may illustrate $P(y_j, TEI)$, which is a probability distribution of the LLR scaling factors described above with reference to Equation 5. In detail, FIG. 8 may illustrate a probability distribution corresponding to each of training LLR scaling factors T_LSF when the training environment information TEI is given and the training LLR scaling factors T_LSF are 1, 2, 3, and 4. Although FIG. 8 illustrates four training LLR scaling factors T_LSF, the number of training LLR scaling factors T_LSF may vary according to embodiments.

Figure 9:
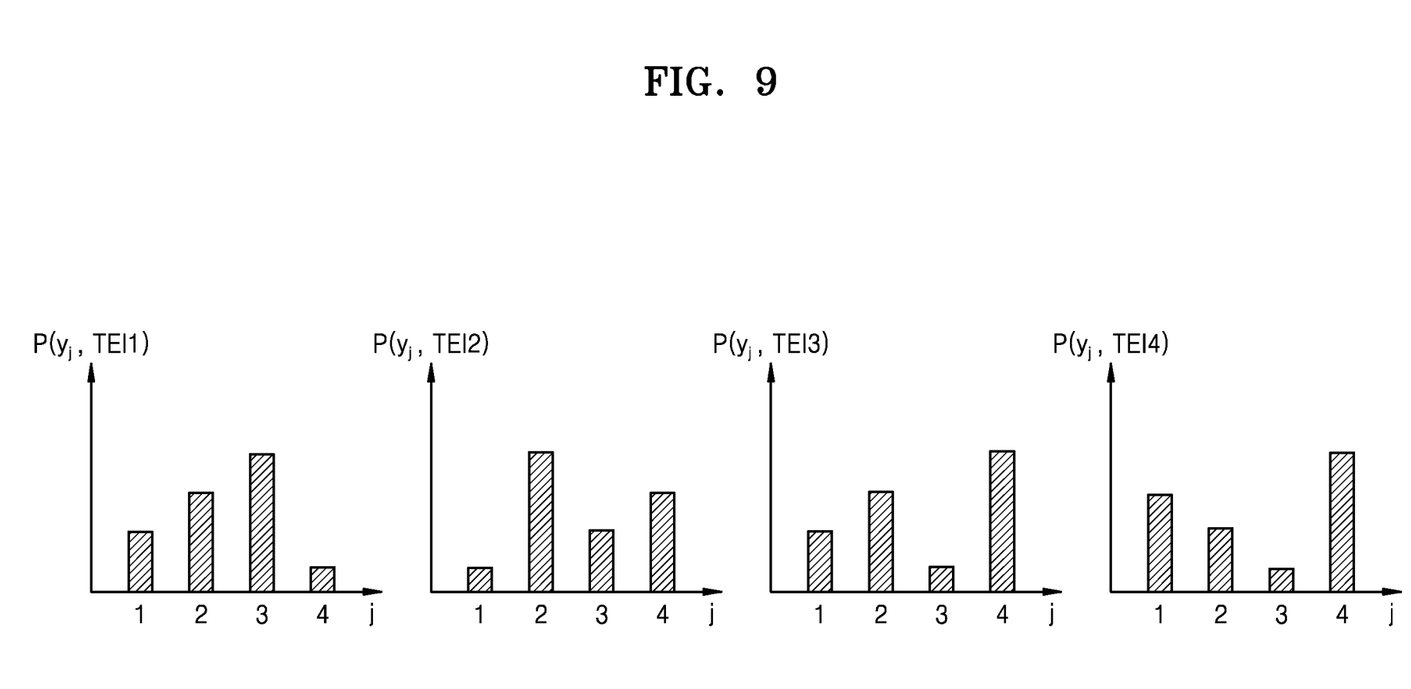
FIG. 9 is a view illustrating LLR scaling factor distributions corresponding to a plurality of pieces of training environment information, according to another embodiment.

FIG. 9 is a view illustrating LLR scaling factor distributions corresponding to a plurality of pieces of training environment information, according to another embodiment. FIG. 9 will now be described in conjunction with FIGS. 1 and 3.

The LLR scaling factor distributions may be different from one another for different pieces of training environment information TEI. The electronic device may receive the communication environment information CEI and determine training environment information TEI most similar to the communication environment information CEI. For example, when second training environment information TEI2 is determined, 2 having a highest probability value in an LLR scaling factor distribution corresponding to second training environment information TEI2 may be selected as the communication LLR scaling factor C_LSF.

Figure 10:
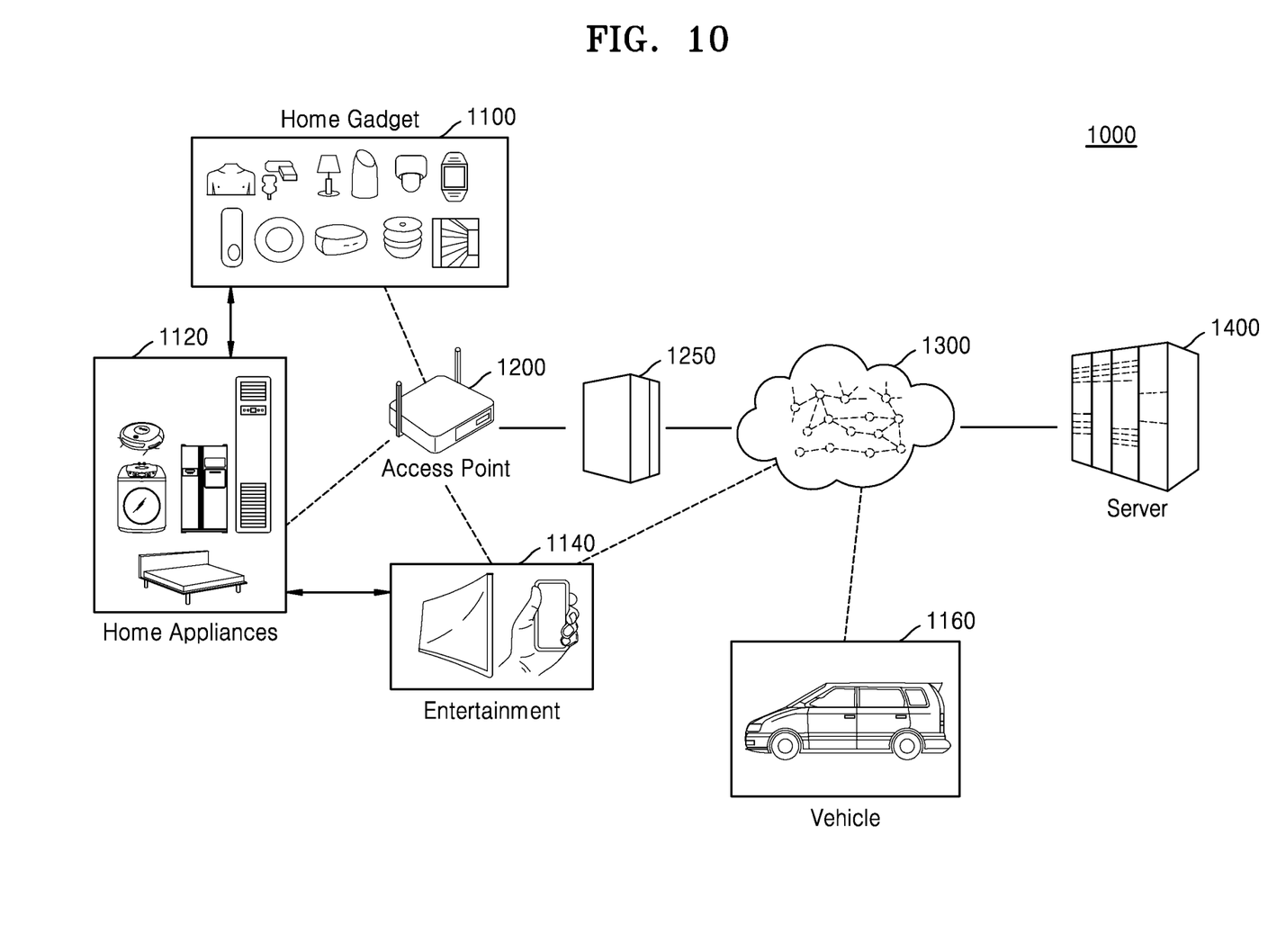
FIG. 10 is a conceptual diagram of an Internet of things (IoT) network system to which embodiments are applied.

FIG. 10 is a conceptual diagram of an Internet of things (IoT) network system to which embodiments are applied.

Referring to FIG. 14, the IoT network system 1000 may include a plurality of IoT devices 1100, 1120, 1140, and 1160, an AP 1200, a gateway 1250, a wireless network 1300, and a server 1400. IoT may refer to a network among things using wired/wireless communication.

The plurality of IoT devices 1100, 1120, 1140, and 1160 may be grouped by the IoT characteristics thereof. For example, IoT devices may be divided into a group of home gadgets 1100, a group of home appliances/furniture 1120, a group of entertainment equipments 1140, or a group of vehicles 1160. The plurality of IoT devices, e.g., the home gadgets 1100, the home appliances/furniture 1120, and the entertainment equipments 1140, may be connected to a communication network or another IoT device through the AP 1200. The AP 1200 may be embedded in one IoT device. The gateway 1250 may change a protocol to allow the AP 1200 to access an external wireless network. The IoT devices, e.g., the home gadgets 1100, the home appliances/furniture 1120, and the entertainment equipments 1140, may be connected to an external communication network through the gateway 1250. The wireless network 1300 may include Internet and/or a public network. The plurality of IoT devices, e.g., the home gadgets 1100, the home appliances/furniture 1120, the entertainment equipments 1140, and the vehicles 1160, may be connected to the server 1400, which provides a certain service, through the wireless network 1300, and users may use the service through at least one of the IoT devices, e.g., the home gadgets 1100, the home appliances/furniture 1120, the entertainment equipments 1140, and the vehicles 1160.

According to an embodiment, the plurality of IoT devices, e.g., the home gadgets 1100, the home appliances/furniture 1120, the entertainment equipments 1140, and the vehicles 1160, may learn an LLR scaling factor distribution, and select an LLR scaling factor, based on the learned LLR scaling factor distribution. Accordingly, the plurality of IoT devices 1100, 1120, 1140, and 1160 may output an LLR distribution with improved quality, and perform decoding based on the LLR distribution with improved quality, thereby reducing decoding errors.

Various changes in form and details may be made without departing from the spirit and scope of the following claims.

What is claimed is:

1. An operation method of an electronic device, the operation method comprising:
   receiving training environment information;
   obtaining a measurement log likelihood ratio (LLR) distribution, based on the training environment information;
   obtaining an inter-distribution divergence value, based on a reference LLR distribution and the measurement LLR distribution;
   obtaining an LLR scaling factor distribution by converting the inter-distribution divergence value into a probability value;
   receiving communication environment information;
   selecting a first LLR scaling factor corresponding to the communication environment information;
   obtaining an output LLR distribution, based on input data and the first LLR scaling factor; and
   obtaining decoding data by decoding the output LLR distribution.

2. The operation method of claim 1, wherein the selecting comprises selecting the first LLR scaling factor corresponding to a largest probability value among probability values included in the LLR scaling factor distribution.

3. The operation method of claim 1, wherein the inter-distribution divergence value, f, is calculated according to equation below $$f(k|TEI, y_j) = \begin{cases} P_{y_j,TEI}(k)\ln\dfrac{P_{y_{jj},TEI}(k)}{P(\Delta_k, Q)}, & \text{if } P_{y_j,TEI}(k) > P(\Delta_k, Q), \\ \quad k = 1 \text{ or } 2n+1 \\ P(\Delta_k, Q)\ln\dfrac{P(\Delta_k, Q)}{P_{y_j,TEI}(k)}, & \text{otherwise}, \end{cases}$$

wherein $P_{y_j,TEI}(k)$ is a probability distribution of the measurement LLR distribution, TEI indicates training environment information, $y_j$ indicates a measurement LLR value for a j-th training LLR scaling factor being selected, and wherein $\Delta_k$ indicates a number of k-th quantized LLR values, and Q indicates a reference LLR distribution.

4. The operation method of claim 1, wherein the probability value is calculated according to equation below $$P(y_j, TEI) = \dfrac{\exp(E(y_j, TEI))}{\sum_{j=1}^{c}\exp(E(y_j, TEI))},$$

wherein $E(y_j, TEL)$ is an estimator function, TEI indicates training environment information, $y_j$ indicates a measurement LLR value for a j-th training LLR scaling factor being selected, and c indicates a number of configurable training LLR scaling factors.

5. The operation method of claim 1, wherein the training environment information comprises at least one of a Signal to Interference plus Noise Ratio (SINR), a modulation order (MO), new transmission or non-transmission, and a number of layers.

6. The operation method of claim 1, wherein a probability distribution of the reference LLR distribution is calculated according to equation below, for which $\Delta_k$ indicates a number of k-th quantized LLR values, $\mathcal{L} = \{\Delta_1, \Delta_2, \ldots, \Delta_{2n+1}\}$ indicates a distribution of quantized LLR values quantized to 2n+1 quantized LLR values, Q indicates a reference LLR distribution, and $\tau_k$ indicates $2^{-k}$:

$$P(\Delta_k, Q) = \begin{cases} \dfrac{\sum_{k \in \mathcal{L}} \Delta_k - 1}{2\sum_{k \in \mathcal{L}} \Delta_k} & \text{if } k = 1 \text{ or } 2n+1, \\ \tau_{k-1} P(\Delta_1, Q) & \text{if } 2 \leq k < n+1, \\ \tau_{2n+1-k} P(\Delta_1, Q) & \text{otherwise.} \end{cases}$$

7. The operation method of claim 1, wherein a probability distribution of the measurement LLR distribution is calculated according to equation below $$P_{y_j, TEI}(k) = \frac{LLR_{k,j}}{LLR_{total,j}}, 1 \leq k \leq 2n+1,$$

wherein TEI indicates training environment information, $y_j$ indicates a measurement LLR value for a j-th training LLR scaling factor being selected, $LLR_{k,j}$ indicates the number of k-th quantized LLR values, and $LLR_{total,j}$ indicates the total number of first through $(2n+1)^{th}$ quantized LLR values.

8. An electronic device comprising:
a log likelihood ratio (LLR) scaling factor selector configured to receive communication environment information and select a first LLR scaling factor corresponding to the communication environment information;
a symbol detector configured to obtain an output LLR distribution, based on input data and the first LLR scaling factor,
wherein the LLR scaling factor selector receives training environment information, obtains a measurement LLR distribution based on the training environment information, obtains an inter-distribution divergence value based on a reference LLR distribution and the measurement LLR distribution, and converts the inter-distribution divergence value into a probability value to obtain an LLR scaling factor distribution; and
a decoder configured to obtain decoding data by decoding the output LLR distribution.

9. The electronic device of claim 8, wherein the LLR scaling factor selector selects the first LLR scaling factor corresponding to a largest probability value among probability values included in the LLR scaling factor distribution.

10. The electronic device of claim 8, wherein the inter-distribution divergence value, f, is calculated according to equation below $$f(k|TEI, y_j) = \begin{cases} P_{y_j, TEI}(k) \ln \dfrac{P_{y_j, TEI}(k)}{P(\Delta_k, Q)}, & \text{if } P_{y_j, TEI}(k) > P(\Delta_k, Q), \\ & k = 1 \text{ or } 2n+1 \\ P(\Delta_k, Q) \ln \dfrac{P(\Delta_k, Q)}{P_{y_j, TEI}(k)}, & \text{otherwise,} \end{cases}$$

wherein $P_{y_j, TEI}(k)$ is a probability distribution of the measurement LLR distribution, TEI indicates training environment information, $y_j$ indicates a measurement LLR value for a j-th training LLR scaling factor being selected, and
wherein $\Delta_k$ indicates a number of k-th quantized LLR values, and Q indicates a reference LLR distribution.

11. The electronic device of claim 8, wherein the probability value is calculated according to equation below $$P(y_j, TEI) = \frac{\exp(E(y_j, TEI))}{\sum_{j=1}^{c} \exp(E(y_j, TEI))},$$

wherein $E(y_j, TEI)$ is an estimator function, TEI indicates training environment information, $y_j$ indicates a measurement LLR value for a j-th training LLR scaling factor being selected, and c indicates a number of configurable training LLR scaling factors.

12. The electronic device of claim 8, wherein the training environment information comprises at least one of a Signal to Interference plus Noise Ratio (SINR), a modulation order (MO), new transmission or non-transmission, and a number of layers.

13. The electronic device of claim 8, wherein a probability distribution of the reference LLR distribution is calculated according to equation below, for which $\Delta_k$ indicates a number of k-th quantized LLR values, $\mathcal{L} = \{\Delta_1, \Delta_2, \ldots, \Delta_{2n+1}\}$ indicates a distribution of quantized LLR values quantized to 2n+1 quantized LLR values, Q indicates a reference LLR distribution, and $\tau_k$ indicates $2^{-k}$:

$$P(\Delta_k, Q) = \begin{cases} \dfrac{\sum_{k \in \mathcal{L}} \Delta_k - 1}{2\sum_{k \in \mathcal{L}} \Delta_k} & \text{if } k = 1 \text{ or } 2n+1, \\ \tau_{k-1} P(\Delta_1, Q) & \text{if } 2 \leq k < n+1, \\ \tau_{2n+1-k} P(\Delta_1, Q) & \text{otherwise.} \end{cases}$$

14. The electronic device of claim 8, wherein a probability distribution of the measurement LLR distribution is calculated according to equation below $$P_{y_j, TEI}(k) = \frac{LLR_{k,j}}{LLR_{total,j}}, 1 \leq k \leq 2n+1,$$

wherein TEI indicates training environment information, $y_j$ indicates a measurement LLR value for a j-th training LLR scaling factor being selected, $LLR_{k,j}$ indicates a number of k-th quantized LLR values, and $LLR_{total,j}$ indicates a total number of first through $(2n+1)^{th}$ quantized LLR values.

15. The electronic device of claim 8, wherein the LLR scaling factor selector is a Bayes classifier using Gaussian Naive Bayes.

16. A non-transitory computer readable storage medium storing instructions configured to cause a processor, when executing the instructions, to perform log likelihood ratio (LLR) scaling factor distribution learning, the LLR scaling factor distribution learning comprising:
receiving training environment information;
obtaining a measurement LLR distribution, based on the training environment information;
obtaining an inter-distribution divergence value, based on a reference LLR distribution and the measurement LLR distribution; and
obtaining an LLR scaling factor distribution by converting the inter-distribution divergence value into a probability value;
receiving communication environment information;

selecting a first LLR scaling factor corresponding to the communication environment information;

obtaining an output LLR distribution, based on input data and the first LLR scaling factor; and obtaining decoding data by decoding the output LLR distribution.

17. The non-transitory computer readable storage medium of claim 16, wherein the training environment information comprises at least one of a Signal to Interference plus Noise Ratio (SINR), a modulation order (MO), new transmission or non-transmission, and a number of layers.

* * * * *